United States Patent
Singh

(10) Patent No.: US 11,657,635 B2
(45) Date of Patent: May 23, 2023

(54) MEASURING CONFIDENCE IN DEEP NEURAL NETWORKS

(71) Applicant: Ford Global Technologies, LLC, Dearborn, MI (US)

(72) Inventor: Gurjeet Singh, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 833 days.

(21) Appl. No.: 16/554,363

(22) Filed: Aug. 28, 2019

(65) Prior Publication Data

US 2021/0064046 A1 Mar. 4, 2021

(51) Int. Cl.
| | |
|---|---|
| G05D 1/00 | (2006.01) |
| G05D 1/02 | (2020.01) |
| G06N 3/04 | (2023.01) |
| G06K 9/62 | (2022.01) |
| G06F 17/18 | (2006.01) |
| B60R 1/00 | (2022.01) |

(52) U.S. Cl.
CPC ............. *G05D 1/0221* (2013.01); *B60R 1/00* (2013.01); *G06F 17/18* (2013.01); *G06K 9/6267* (2013.01); *G06N 3/0454* (2013.01); *G06N 3/0472* (2013.01); *G06N 3/0481* (2013.01); *G05D 2201/0213* (2013.01)

(58) Field of Classification Search
CPC .......... G05D 1/0221; G05D 2201/0213; B60R 1/00; G06F 17/18; G06K 9/6267; G06K 9/6265; G06K 9/6273; G06K 9/6268; G06N 3/0454; G06N 3/0472; G06N 3/0481; G06N 3/084; G06N 3/0445; G06V 10/454; G06V 10/82; G06V 20/58; G06V 20/582; G06V 40/103
See application file for complete search history.

(56) References Cited

U.S. PATENT DOCUMENTS

| | | |
|---|---|---|
| 2005/0273277 A1 | 12/2005 | Ridnour et al. |
| 2009/0093928 A1 | 4/2009 | Getman et al. |
| 2018/0061253 A1* | 3/2018 | Hyun ................... G08G 1/0175 |
| 2018/0114114 A1* | 4/2018 | Molchanov ............ G06N 3/084 |
| 2018/0276839 A1 | 9/2018 | Diessner et al. |
| 2018/0285740 A1* | 10/2018 | Smyth ..................... G06N 3/082 |
| 2019/0016264 A1* | 1/2019 | Potnis .................... B60D 1/245 |
| 2019/0129429 A1 | 5/2019 | Juelsgaard et al. |
| 2020/0042878 A1* | 2/2020 | Mixter ................... G06N 3/049 |
| 2021/0294877 A1* | 9/2021 | Konrardy ............... G08B 21/00 |

OTHER PUBLICATIONS

Hercus et al, Control of an unmanned aerial vehicle using a neuronal network, 2013 IEEE Symposium on Computational Intelligence, Cognitive Algorithms, Mind, and Brain (CCMB), pp. 73-79 (Year: 2013).*

Srivastava et al, "Dropout: A simple way to prevent neural networks from overfitting", J. Mach. Learn. Res., vol. 15, No. 1, pp. 1929-1958 (Year: 2014).*

* cited by examiner

*Primary Examiner* — Nancy Bitar
*Assistant Examiner* — Xiao Liu
(74) *Attorney, Agent, or Firm* — Brandon Hicks; Bejin Bieneman PLC

(57) ABSTRACT

A distribution of a plurality of predictions generated by a deep neural network using sensor data is calculated, and the deep neural network includes a plurality of neurons. At least one of a measurement or a classification corresponding to an object is determined based on the distribution. The deep neural network generates each prediction of the plurality of predictions with a different number of neurons.

17 Claims, 9 Drawing Sheets

MEASURING CONFIDENCE IN DEEP NEURAL NETWORKS

BACKGROUND

Sensors are used to collect environmental data. For example, sensors may capture images, sound, vibration, and other physical characteristics. Once collected, the sensors can send the environmental data to other electronic devices for further action.

DETAILED DESCRIPTION

Figure 1:
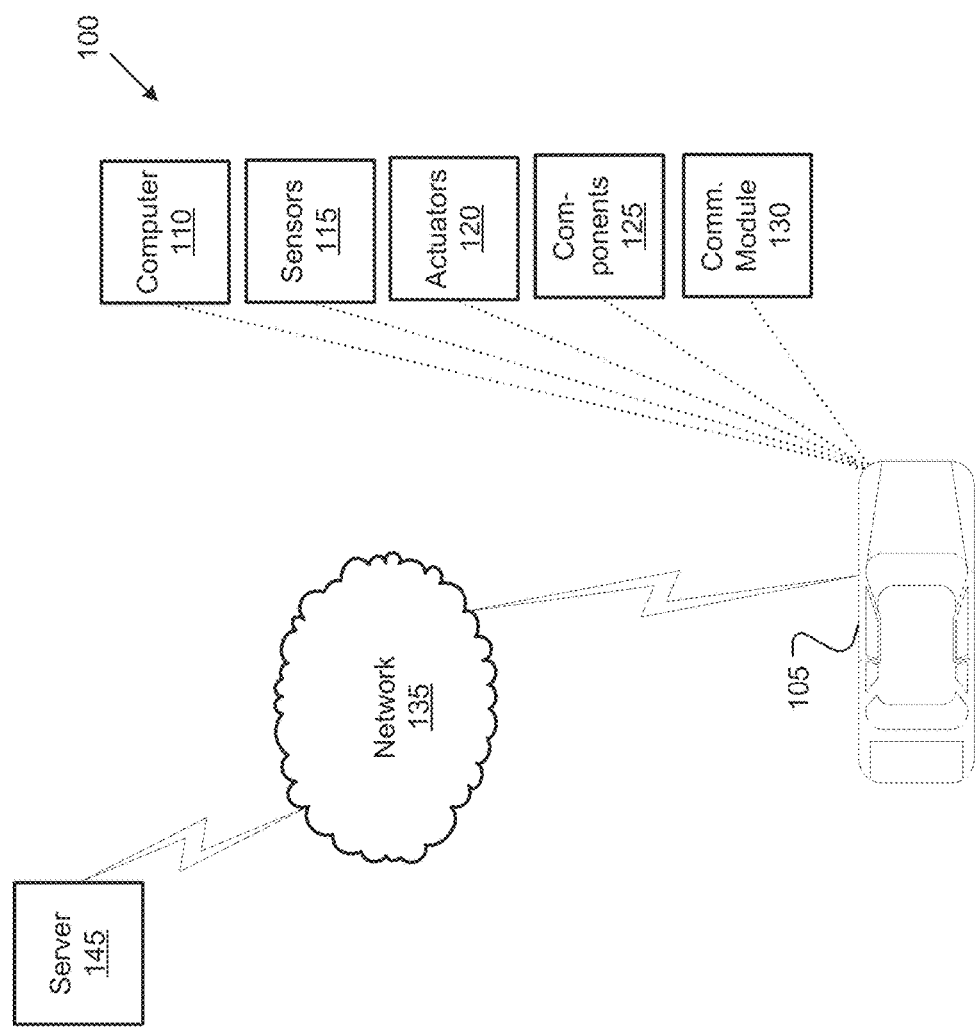
FIG. 1 is a diagram of an example system for determining a distribution based on sensor data.

Sensors can provide information about a surrounding environment, and computers can use sensor data detected by the sensors to classify objects and/or estimate one or more physical parameters pertaining to the surrounding environment. Some computers may use machine learning techniques to assist in classifying objects and/or estimating physical parameters. However, these machine learning techniques may not have access to ground truth data and/or absolute values, which could result in incorrect classifications and/or estimations in real-time.

Disclosed herein are systems and methods for generating a distribution based on a plurality of predictions generated by a deep neural network. The deep neural network generates the plurality of predictions based on sensor data detected by the vehicle sensors. After each prediction is generated, one or more neurons of the deep neural network are disabled. The deep neural network then generates another prediction with one or more neurons disabled. Since the deep neural network generates a prediction with fewer neurons than the previous iteration, the prediction typically statistically differs with respect to previous predictions. Once a plurality of predictions has been generated, a computer generates the distribution using the predictions and calculates the distribution variation. In an example, the distribution may represent the standard deviation of the predictions to indicate whether the deep neural network has been trained with similar sensor data. However, it is understood that the distribution may represent other statistical measurements of the predictions. Alternatively or additionally, the computer can classify a relative confidence parameter based on the distribution variation.

A system comprises a computer including a processor and a memory, and the memory including instructions such that the processor is programmed to calculate a distribution of a plurality of predictions generated by a deep neural network using sensor data, wherein the deep neural network includes a plurality of neurons; and determine at least one of a measurement or a classification corresponding to an object based on the distribution. The deep neural network generates each prediction of the plurality of predictions with a different number of neurons.

In other features, the processor is further programmed to compare a standard deviation of the distribution with a predetermined variation threshold; and transmit, to a server, the sensor data when the standard deviation is greater than the predetermined variation threshold.

In other features, the processor is further programed to disable an autonomous vehicle mode of a vehicle when the distribution is greater than the predetermined distribution variation threshold, wherein the vehicle includes the computer.

In other features, the processor is further programmed to provide the sensor data to the deep neural network; receive a first prediction generated by the deep neural network based on the sensor data; disable at least one neuron of the plurality of neurons after the first prediction; provide the sensor data to the deep neural network; and receive a second prediction generated by the deep neural network.

In other features, the processor is further programmed to receive the sensor data from a vehicle sensor of a vehicle; and provide the sensor data to the deep neural network.

In other features, the deep neural network comprises at least one of a convolutional neural network, a recurrent neural network, or a combination of the convolutional neural network and the recurrent neural network.

In other features, the processor is further programmed to provide an image captured by an image sensor of a vehicle to the deep neural network; receive a first prediction generated by the deep neural network based on the image; disable at least one neuron of plurality of neurons within the deep neural network after the first prediction; provide the image to the deep neural network; receive a second prediction generated by the deep neural network; calculate an average based on at least the first prediction and the second prediction; and determine the at least one of the measurement or the classification based on the average.

In other features, the object comprises at least a portion of a trailer connected to a vehicle and the measurement comprises a trailer angle.

In other features, the processor is further programmed to actuate a vehicle based on the at least one of the measurement or the classification.

A system includes a server and a vehicle including a vehicle system. The vehicle system includes a computer including a processor and a memory, the memory including instructions such that the processor is programmed to: calculate, at the vehicle, a distribution of a plurality of predictions generated by a deep neural network using sensor data, wherein the deep neural network includes a plurality of neurons; and determine at least one of a measurement or a classification corresponding to an object detected by the sensor data. The deep neural network generates each prediction of the plurality of predictions with a different number of neurons.

In other features, the processor is further programmed to compare a standard deviation of the distribution with a predetermined variation threshold; and transmit, to the server, the sensor data when the standard deviation is greater than the predetermined variation threshold.

In other features, the processor is further programed to disable an autonomous vehicle mode of a vehicle when the distribution is greater than the predetermined distribution variation threshold.

In other features, the processor is further programmed to provide the sensor data to the deep neural network; receive a first prediction generated by the deep neural network based on the sensor data; disable at least one neuron of the plurality of neurons after the first prediction; provide the sensor data to the deep neural network; and receive a second prediction generated by the deep neural network.

In other features, the processor is further programmed to receive the sensor data from a vehicle sensor of a vehicle; and provide the sensor data to the deep neural network.

In other features, the deep neural network comprises at least one of a convolutional neural network, a recurrent neural network, or a combination of the convolutional neural network and the recurrent neural network In other features, the processor is further programmed to provide an image captured by an image sensor of a vehicle to the convolutional neural network; receive a first prediction generated by the convolutional neural network based on the image; disable at least one neuron of plurality of neurons within the convolutional neural network after the first prediction; provide the image to the convolutional neural network; receive a second prediction generated by the convolutional neural network; calculate an average based on at least the first prediction and the second prediction; and determine the at least one of the measurement or the classification based on the average.

In other features, the object comprises at least a portion of a trailer connected to the vehicle and the measurement comprises a trailer angle.

In other features, the processor is further programmed to actuate the vehicle based on the at least one of the measurement or the classification.

A method comprises calculating a distribution of a plurality of predictions generated by a deep neural network using sensor data, wherein the deep neural network includes a plurality of neurons; and determining at least one of a measurement or a classification corresponding to an object based on the distribution. The deep neural network generates each prediction of the plurality of predictions with a different number of neurons.

In other features, the method further includes providing the sensor data to the deep neural network; receiving a first prediction generated by the deep neural network based on the sensor data; disabling at least one neuron of the plurality of neurons after the first prediction; providing the sensor data to the deep neural network; and receiving a second prediction generated by the deep neural network.

FIG. 1 is a block diagram of an example vehicle control system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, hydrogen-fuel cell, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, hydrogen fuel cell, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 includes one or more mechanisms by which a computer 110 may communicate with a server 145. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

The server 145 can be a computing device, i.e., including one or more processors and one or more memories, programmed to provide operations such as disclosed herein. Further, the server 145 can be accessed via the network 135, e.g., the Internet or some other wide area network.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Various techniques such as are known may be used to interpret sensor 115 data. For example, camera and/or lidar image data can be provided to a classifier that comprises programming to utilize one or more image classification techniques. The classifier can use a machine learning technique in which data known to represent various objects, is provided to a machine learning program for training the classifier. Once trained, the classifier can accept as input an image and then provide as output, for each of one or more respective regions of interest in the image, an indication of one or more objects or an indication that no object is present in the respective region of interest. Further, a coordinate system (e.g., polar or cartesian) applied to an area proximate to a vehicle 105 can be applied to specify locations and/or areas (e.g., according to the vehicle 105 coordinate system, translated to global latitude and longitude geo-coordinates, etc.) of objects identified from sensor 115 data. Yet further, a computer 110 could employ various techniques for fusing data from different sensors 115 and/or types of sensors 115, e.g., lidar, radar, and/or optical camera data. It is understood that other suitable techniques may be used to interpret sensor 115 data as well. These techniques may include, but are not limited to, regression, object detection, object tracking, image segmentation, image semantic segmentation, optical flow, and the like.

The computer 110 can generate a distribution representing one or more outputs and predict an output based on the distribution using a machine learning program. FIGS. 2A through 2D are diagrams of an example deep neural network (DNN) 200. The DNN 200 can be a software program that can be loaded in memory and executed by a processor included in computer 110, for example. In an example implementation, the DNN 200 can include, but is not limited to, a convolutional neural network (CNN), a R-CNN (regions with CNN features), a Fast R-CNN, a Faster R-CNN, a Mask R-CNN, a recurrent neural network (RNN), Yolo, combinations thereof, and the like. The DNN 200 includes multiple neurons 205, and the neurons 205 are arranged so that the DNN 200 includes an input layer, one or more hidden layers, and an output layer. Each layer of the DNN 200 can include a plurality of neurons 205. While FIGS. 2A through 2D illustrate three (3) hidden layers, it is understood that the DNN 200 can include additional or fewer hidden layers. The input and output layers may also include more than one (1) neuron 205.

The neurons 205 are sometimes referred to as artificial neurons 205, because they are designed to emulate biological, e.g., human, neurons. A set of inputs (represented by the arrows) to each neuron 205 are each multiplied by respective weights. The weighted inputs can then be summed in an input function to provide, possibly adjusted by a bias, a net input. The net input can then be provided to activation function, which in turn provides a connected neuron 205 an output. The activation function can be a variety of suitable functions, typically selected based on empirical analysis. As illustrated by the arrows in FIGS. 2A through 2D, neuron 205 outputs can then be provided for inclusion in a set of inputs to one or more neurons 205 in a next layer.

The DNN 200 can be trained to accept sensor 115 data, e.g., from the vehicle 101 CAN bus or other network, as input and generate a distribution of possible outputs based on the input. The DNN 200 can be trained with ground truth data, i.e., data about a real-world condition or state. For example, the DNN 200 can be trained with ground truth data or updated with additional data by a processor of the server 145. The DNN 200 can be transmitted to the vehicle 105 via the network 135. Weights can be initialized by using a Gaussian distribution, for example, and a bias for each neuron 205 can be set to zero. Training the DNN 200 can including updating weights and biases via suitable techniques such as back-propagation with optimizations. Ground truth data can include, but is not limited to, data specifying objects within an image or data specifying a physical parameter, e.g., angle, speed, distance, or angle of object relative to another object. For example, the ground truth data may be data representing and objects and object labels. In another example, the ground truth data may be data representing object and a relative angle of the object with respect to another object.

Figure 2B:
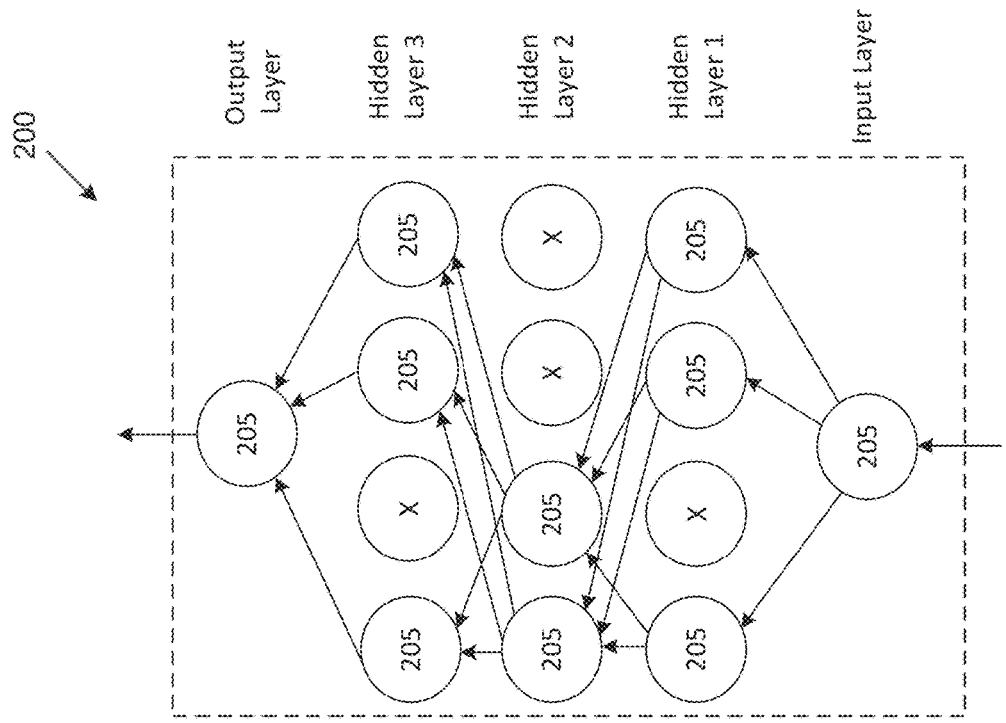
FIGS. 2A through 2D are diagrams of an example deep neural network.
Figure 2A:
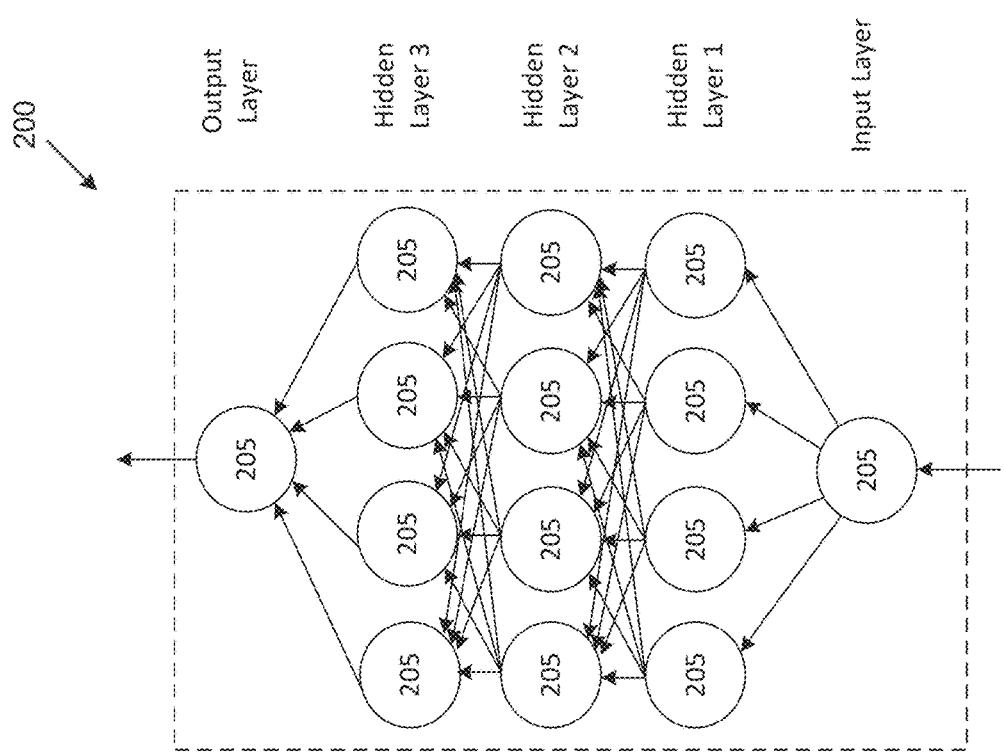
Figure 2D:
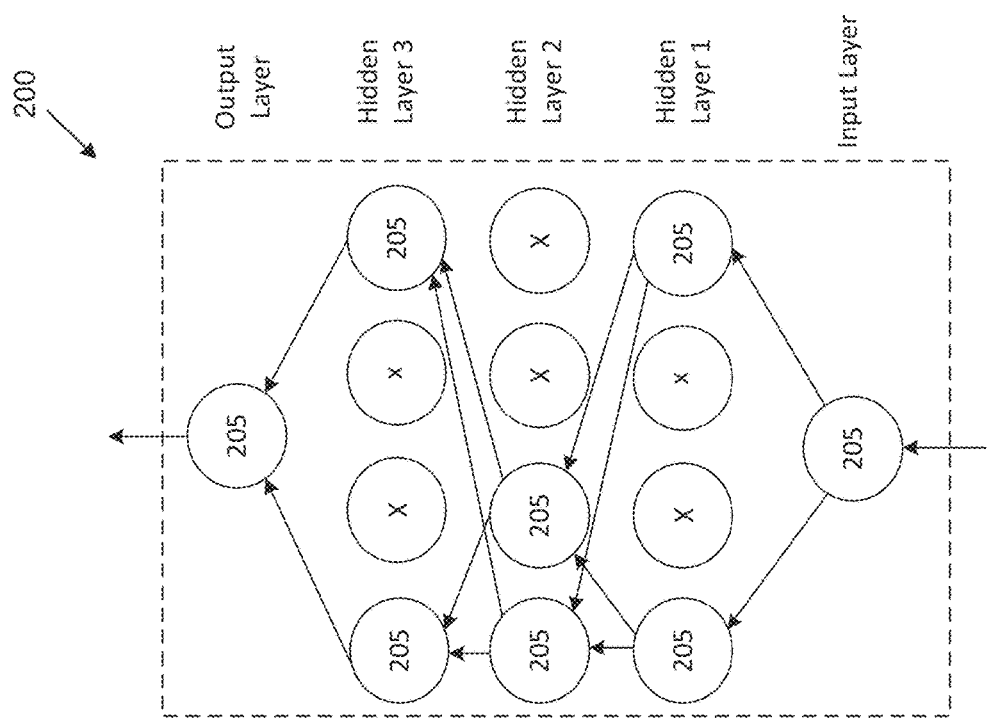
Figure 2C:
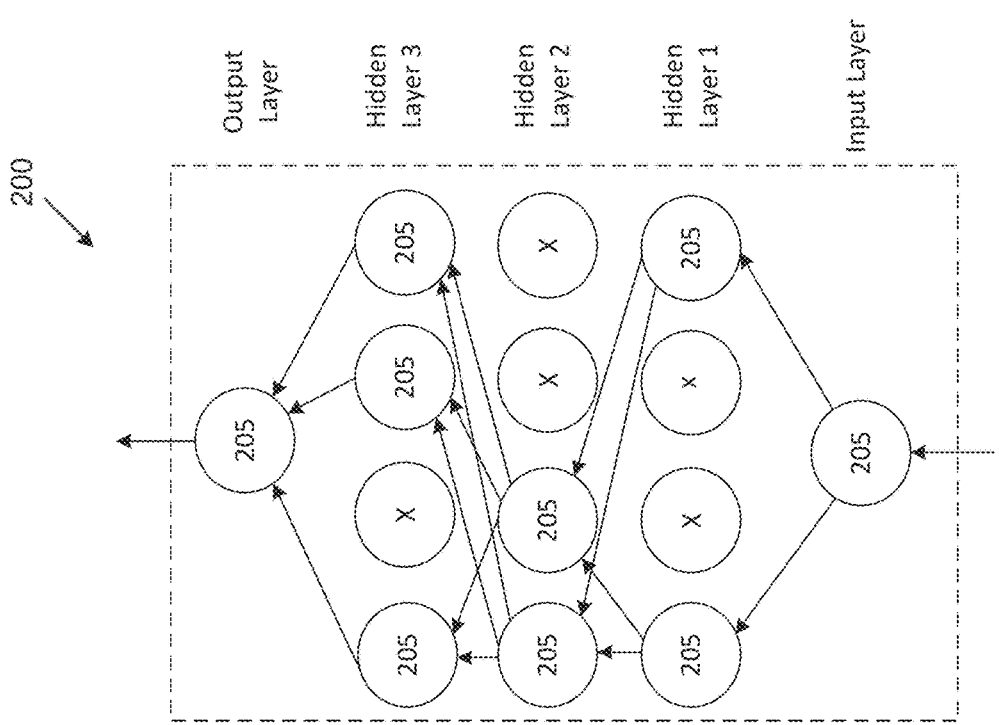

During operation, the vehicle 105 computer 110 obtains sensor data from the sensors 115 and provides the data as input to the DNN 200. Initially, the DNN 200 can generate a prediction based on the sensor data using each of the neurons 205 as shown in FIG. 2A. Subsequently, the computer 110 disables one or more neurons 205 within the DNN 200, and the DNN 200 (including the one or more disabled neurons as denoted with the "X") generates another prediction using the input data. When a neuron 205 is disabled, the disabled neuron 205 is not used by the DNN 200 to generate a subsequent prediction as shown in FIGS. 2B through 2D. In an example implementation, the computer 110 may randomly disable up to five percent (5%) of the presently enabled neurons 205. The computer 110 may select neurons 205 to disable based on a Bernoulli distribution. However, it is understood that the computer may select neurons 205 to disable using other suitable statistical selection processes. The disabling of one or more neurons 205 and generation of an additional prediction by the DNN 200 may occur a plurality of times, as described in greater detail below. A prediction may be defined as forecasting a measurement based on the sensor data. In some implementations, the computer 110 may randomly disable between one percent (1%) and twenty percent (20%) of the presently enabled neurons 205. However, it is understood that other percentages may be utilized according to the configuration of the DNN 200.

The computer 110 can generate a distribution using the predictions. The distribution may represent the value of the predictions corresponding to the sensor data input to the DNN 200. In an example implementation, the computer 110 calculates the standard deviation and the average values, e.g., the mean, the mode, and the median, of the predictions. Based on the standard deviation, the computer 110 can determine a confidence parameter. In an example, the computer 110 assigns a "high" confidence parameter when the standard deviation is less than or equal to a predetermined distribution variation threshold and assigns a "low" confidence parameter when the standard deviation is greater than the predetermined distribution variation threshold. A "low" confidence parameter may be indicative that the DNN 200 has not been trained with similar input data. Images corresponding to the "low" confidence parameter may be provided to the server 145 for further DNN 200 training. Alternatively or additionally, the computer 110 determines an output based on the standard deviations. For example, the computer 110 may use an average of the predictions to generate an output, e.g., object prediction, object classification, or the like. The predetermined distribution variation threshold may be determined through empirical testing related to whether the DNN 200 has been trained with data representative of various physical environments.

Figure 3:
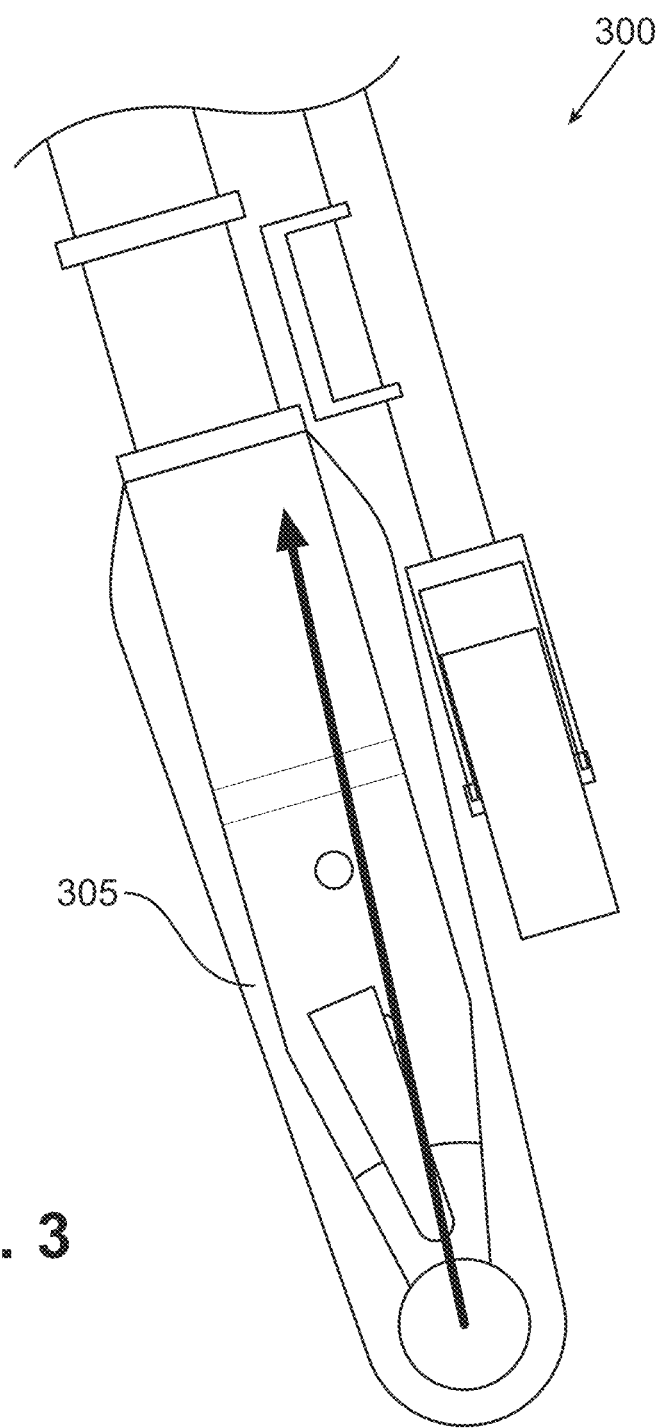
FIG. 3 is an example image frame of a trailer connected to a vehicle and a trailer angle value predicted based on the distribution of predicted trailer angle values.

FIG. 3 illustrates an example image 300 of a trailer 305 connected to a vehicle, e.g., vehicle 105. In an example implementation, the sensors 115 of the vehicle 105 can capture an image of a position of the trailer 305 with respect to the sensors 115. The vehicle 105 computer 110 provides the image 300 to the DNN 200, and the DNN 200 generates a plurality of predicted trailer angle values based on the image 300. Once the plurality of predicted trailer angle values is generated, the computer 110 can determine the distribution, e.g., the standard deviation, of the predicted trailer angle values and/or the average values of the predicted trailer angle values. The computer 110 may determine, or assign, an output value based on the average values. For example, the computer 110 may calculate the mean of the predicted trailer angle values and assign the calculated mean as the trailer angle output value. As shown in FIG. 3, the trailer angle output value is 103.56 degrees.

Figure 4:
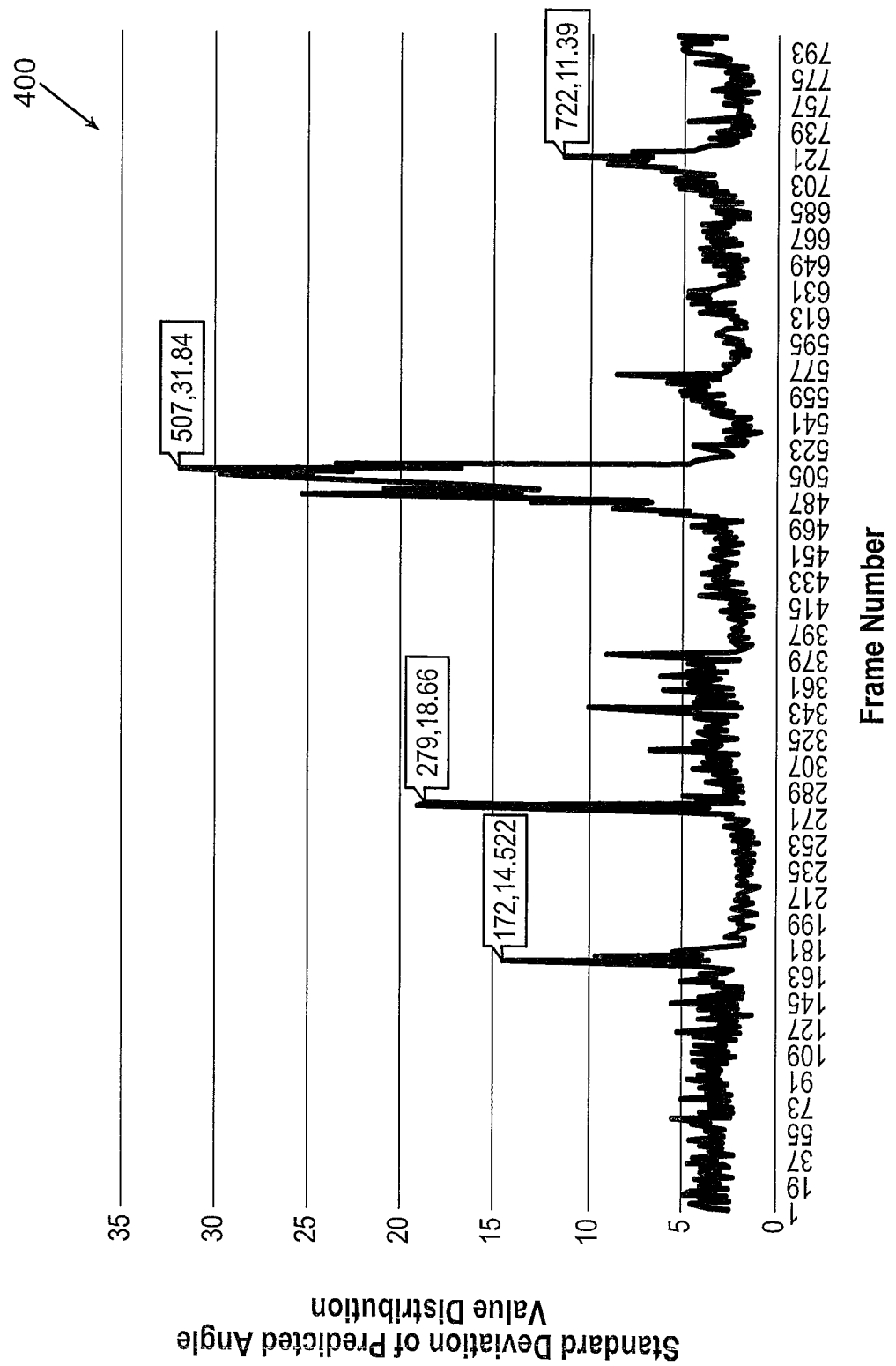
FIG. 4 is a graph of an example standard deviation of predicted trailer angle values corresponding to a number of image frames.

FIG. 4 is a graph 400 illustrating the calculated standard deviations of the predicted trailer angle values based on multiple captured images. As shown in graph 400, the predictions corresponding to image frame 172 have a standard deviation of 14.522, and the predictions corresponding to image frame 507 have a standard deviation of 31.84. The relatively higher standard deviation may be indicative that the DNN 200 has not been trained with similar images. For example, the trailer 405 may have been obfuscated due to lack of light or lack of clarity.

Figure 5:
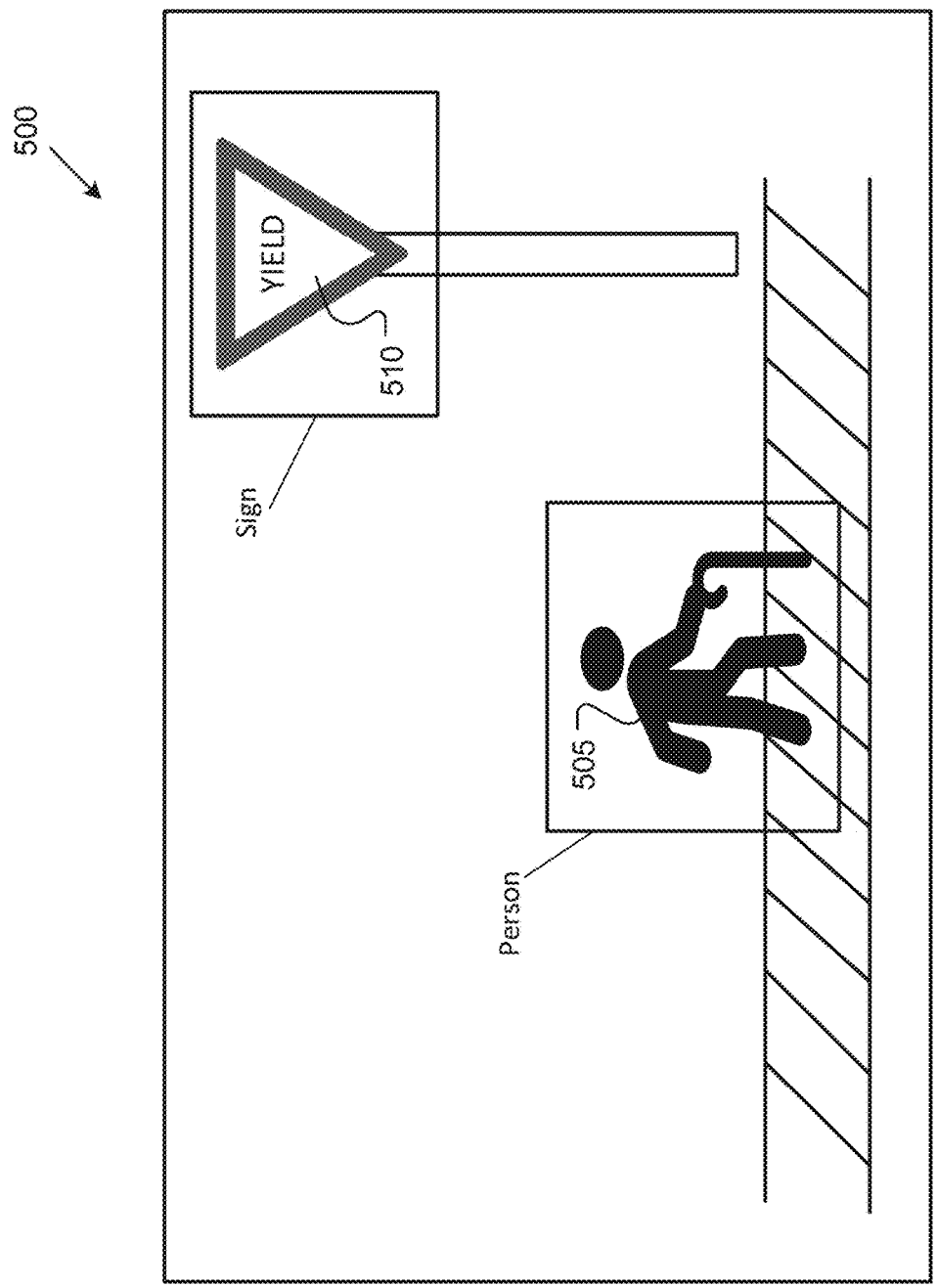
FIG. 5 is an example image frame of multiple objects detected by a vehicle sensor and the corresponding object classifications.

FIG. 5 illustrates an example image 500 captured by the vehicle 105 sensors 115. As shown, the output values assigned by the computer 110 may be object classifications. For example, the DNN 200 generates a plurality of predictions using the image 500 as described above. The computer 110 calculates a standard deviation of the predictions and can assign object classifications based on the standard deviation. As shown in FIG. 5, the computer 110 can classify object 505 as a person and classify object 510 as a sign based on the standard deviation.

Figure 6:
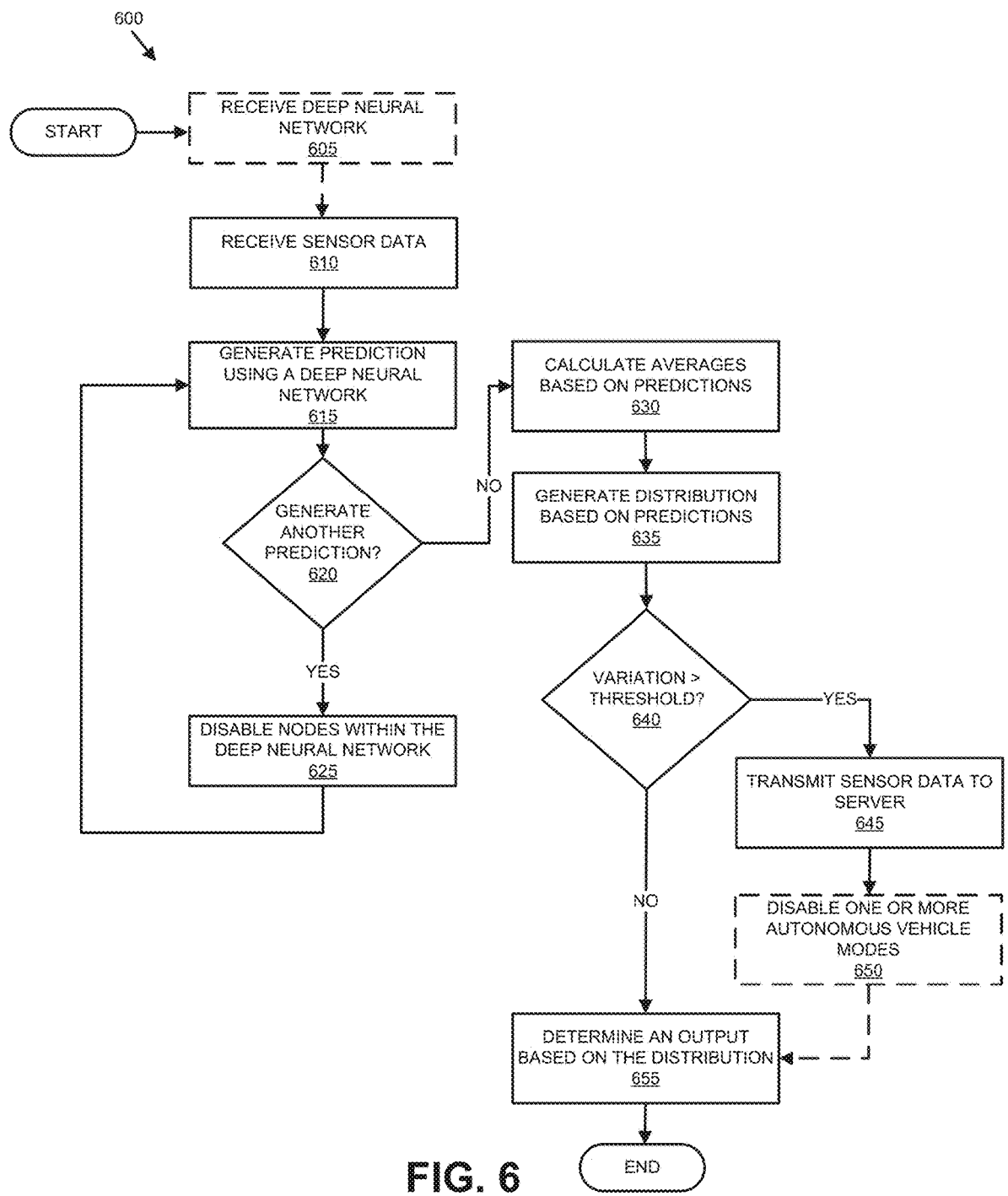
FIG. 6 is a flow diagram illustrating an example process for determining a distribution based on sensor data and generating an output based on the distribution.

FIG. 6 is a flowchart of an exemplary process 600 for generating a distribution based on the plurality of predictions and generating an output based on the distribution. Blocks of the process 600 can be executed by the computer 110. The process 600 begins at block 605, in which the computer 110 receives a DNN 200 from the server 145 over the network 135. It is understood that, in some implementations, block 605 may be omitted from process 600.

In block 610, the computer 110 receives sensor data from the sensors 115. For example, the sensor data may be image frames captured by a camera sensor 115. The DNN 200 generates a prediction using the sensor data at block 615. For example, a CNN may generate a prediction based on an image captured by the sensors 115. At block 620, a determination is made whether to generate another prediction via the DNN 200. For example, the computer 110 may maintain a counter indicative of how many predictions the DNN 200 has generated using the sensor data. After the DNN 200 has generated a prediction using the sensor data, the computer 110 can increment the counter and compare the current counter value to a predetermined counter threshold value. The predetermined counter threshold value may be determined through empirical testing related to the sample size of predictions generated by the DNN 200 and the distribution of the predictions.

At block 625, the computer 110 disables one or more neurons 205 within the DNN 200 and the process 600 returns to block 615 to generate another prediction with the DNN 200. For example, if the counter value is less than the predetermined counter threshold value, the computer 110 can disable one or more neurons 205 within the DNN 200 and cause the DNN 200 to generate another prediction using the sensor data. In this context, another prediction is generated by the DNN 200, and the DNN 200 generates the prediction with fewer enabled neurons 205. Since the DNN 200 is generating another prediction with fewer enabled neurons 205, the prediction may statistically differ with respect to previously generated predictions using the same sensor data. As discussed above, the computer 110 can disable the neurons 205 through one or more random selection processes.

If no additional predictions are to be generated, the computer 110 calculates the averages of the predictions at block 630. For example, if the counter value is equal to or greater than the predetermined counter threshold value, the computer 110 calculates the averages using the predictions generated by the DNN 200. The averages may include the mean value of the predictions, the mode value of the predictions, and the median value of the predictions. At block 635, the computer 110 generates a distribution based on the predictions. For example, the computer 110 calculates the distribution, e.g., the standard deviation, using the calculated averages. The computer 110 determines whether the distribution variation is greater than a predetermined distribution variation threshold at block 640. If the distribution variation is greater than the predetermined distribution variation threshold, e.g., a low confidence parameter, the computer 110 transmits the data to the server 145 via the network 135 at block 645. In this context, the server 145 may use the sensor data for additional training of the DNN 200 since the standard deviation for the sensor data is relatively higher. In some implementations, as described below, the computer 110 may generate sub-models based on the sensor data using federated learning techniques. Otherwise, if the distribution variation is less than or equal to the predetermined distribution variation threshold, the computer 110 assigns a high confidence parameter to the distribution.

Optionally, at block 650, the computer 110 may initiate one or more vehicle operations. In an example implementation, the computer 110 may disable one or more autonomous vehicle 105 modes. For example, a traction control system, a lane keeping system, a lane change system, speed management, a collision avoidance system, pedestrian detection, vehicle three-dimensional pose detection, free space detection, road debris detection, traffic sign detection, sematic segmentation of environment, etc., could be disabled or modified as a result of the distribution variation being greater than the predetermined distribution variation threshold. Yet further, for example, vehicle 105 features allowing a semi-autonomous "hands-off" mode in which an operator could have hands off a steering wheel could be disabled when the distribution variation is greater than the predetermined distribution variation threshold. In some examples, the computer 110 may initiate one or more control protocols in response to determining that the distribution variation being greater than the predetermined distribution variation threshold.

At block 655, the computer 110 determines an output based on the distribution. For example, the computer 110 may classify an object, e.g., a street sign, a pedestrian, detected by the sensor data. In another example, the computer 110 may determine a physical measurement, e.g., trailer angle relative to the vehicle 105, distance between an object and the vehicle 105, based on the sensor data.

Figure 7:
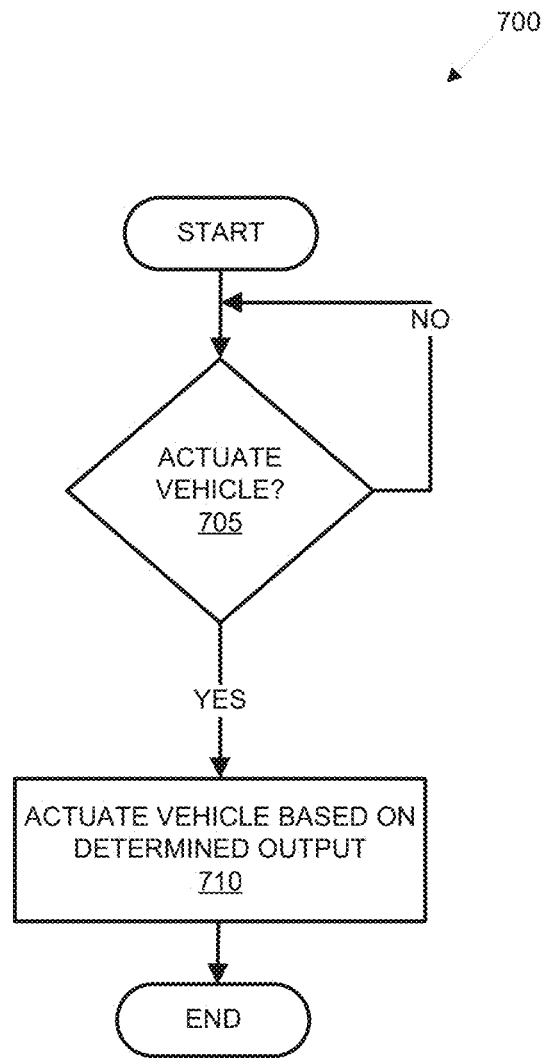
FIG. 7 is a flow diagram illustrating an example process for determining whether to actuate a vehicle.

FIG. 7 is a flowchart of an exemplary process 700 for controlling the vehicle 105 based on the determined output. Blocks of the process 700 can be executed by the computer 110. The process 700 begins at block 705, in which the computer 110 determines whether to actuate the vehicle 105 based on the determined output. The computer 110 can include a lookup table that establishes a correspondence between a determined output and a vehicle actuation action. For example, based on the determined trailer angle, the computer 110 may cause the vehicle 105 to perform a specified action, e.g., initiate a vehicle 105 turn, adjust vehicle 105 direction, adjust vehicle 105 speed, etc. In another example, based on the determined distance between the vehicle 105 and an object, the computer 110 may cause the vehicle 105 to perform a specified action, e.g., initiate a vehicle 105 turn, initiate an external alert, adjust vehicle 105 speed, etc. For instance, the computer 110 may initiate the specified action to avoid a collision, perform a lane change, and/or to mitigate lane drift, e.g., maintain the vehicle 105 within the relative center of two-lane markers.

If the computer determines that no actuation is to occur, the process 700 returns to block 705. Otherwise, at block 710, the computer 110 causes the vehicle 105 to actuate according to the specified action. For example, the computer 110 transmits the appropriate control signals to the corresponding vehicle 105 actuators 120.

Figure 8:
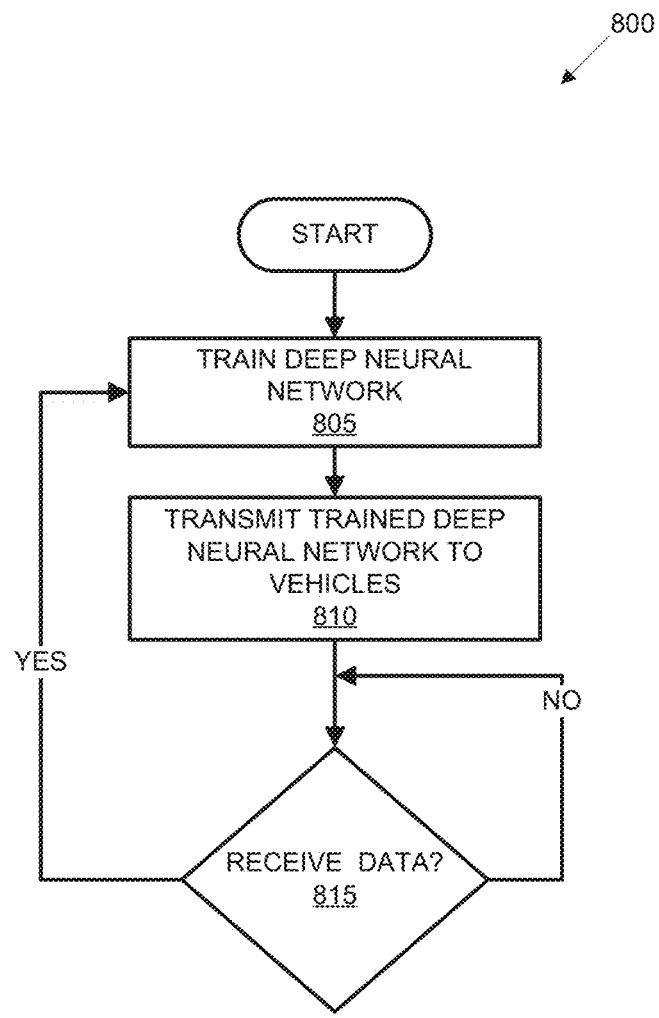
FIG. 8 is a flow diagram illustrating an example process for training a deep neural network.

FIG. 8 is a flowchart of an exemplary process 800 for training the DNN 200. Blocks of the process 800 can be executed by the server 145. The process 800 begins in a block 805, in which the server 145 trains the DNN 200. For example, the DNN 200 may be trained with ground truth data or sensor data, such as sensor data provided by the vehicle 105. The sensor data provided by the vehicle 105 may be the sensor data corresponding to the distribution variation having a value greater than the predetermined distribution variation threshold. At block 810, the server 145 transmits the trained DNN 200 to the vehicle 105.

The server 145 determines whether data has been received at block 815. For example, the data may be sub-model data that the computer 110 has uploaded as a result of the computer 110 determining that the corresponding distribution variation is greater than the predetermined distribution variation threshold. In an example implementation, the sub-model may be generated using federated learning techniques in which the computer 110 trains one or more models using the sensor data having a distribution variation greater than the predetermined distribution variation threshold. If no additional data has been uploaded, the process 800 returns to block 815. If additional data has been uploaded, the process 800 returns to block 805 so that the DNN 200 can be trained with the uploaded data representing the trained sub-models.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, TensorFlow, PyTorch, Keras, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   receive a first prediction generated by a deep neural network based on sensor data;
   disable at least one neuron of a plurality of neurons of the deep neural network after the first prediction;
   then provide the sensor data to the deep neural network and receive a second prediction generated by the deep neural network based on the sensor data;
   calculate a distribution of a plurality of predictions that include the first prediction and the second prediction; and
   determine at least one of a measurement or a classification corresponding to an object based on the distribution,
   wherein the deep neural network generates each prediction of the plurality of predictions with a different number of neurons determined by randomly disabling some of the plurality of neurons.

2. The system of claim 1, wherein the processor is further programmed to:
   compare a standard deviation of the distribution with a predetermined variation threshold; and
   transmit, to a server, the sensor data when the standard deviation is greater than the predetermined variation threshold.

3. The system of claim 2, wherein the process is further programmed to:
   disable an autonomous vehicle mode of a vehicle when the distribution is greater than the predetermined distribution variation threshold, wherein the vehicle includes the computer.

4. The system of claim 1, wherein the processor is further programmed to:

receive the sensor data from a vehicle sensor of a vehicle; and provide the sensor data to the deep neural network.

5. The system of claim 1, wherein the deep neural network comprises at least one of a convolutional neural network, a recurrent neural network, or a combination of the convolutional neural network and the recurrent neural network.

6. The system of claim 1, wherein the processor is further programmed to:
provide an image captured by an image sensor of a vehicle to the deep neural network;
receive a first prediction generated by the deep neural network based on the image;
disable at least one neuron of plurality of neurons within the deep neural network after the first prediction;
provide the image to the deep neural network;
receive a second prediction generated by the deep neural network;
calculate an average based on at least the first prediction and the second prediction; and
determine the at least one of the measurement or the classification based on the average.

7. The system of claim 1, wherein the object comprises at least a portion of a trailer connected to a vehicle and the measurement comprises a trailer angle.

8. The system of claim 1, wherein the processor is further programmed to:
actuate a vehicle based on the at least one of the measurement or the classification.

9. A system comprising:
a server; and
a vehicle including a vehicle system, the vehicle system comprising a computer including a processor and a memory, the memory including instructions such that the processor is programmed to:
receive a first prediction generated by a deep neural network based on sensor data;
disable at least one neuron of a plurality of neurons of the deep neural network after the first prediction;
then provide the sensor data to the deep neural network and receive a second prediction generated by the deep neural network;
calculate, at the vehicle, a distribution of a plurality of predictions that include the first prediction and the second prediction; and
determine at least one of a measurement or a classification corresponding to an object detected by the sensor data,
wherein the deep neural network generates each prediction of the plurality of predictions with a different number of neurons determined by randomly disabling some of the plurality of neurons.

10. The system of claim 9, wherein the processor is further programmed to:
compare a standard deviation of the distribution with a predetermined variation threshold; and
transmit, to the server, the sensor data when the standard deviation is greater than the predetermined variation threshold.

11. The system of claim 10, wherein the process is further programmed to:
disable an autonomous vehicle mode of the vehicle when the distribution is greater than the predetermined distribution variation threshold.

12. The system of claim 9, wherein the processor is further programmed to:
receive the sensor data from a vehicle sensor of the vehicle; and
provide the sensor data to the deep neural network.

13. The system of claim 9, wherein the deep neural network comprises at least one of a convolutional neural network, a recurrent neural network, or a combination of the convolutional neural network and the recurrent neural network.

14. The system of claim 9, wherein the processor is further programmed to:
provide an image captured by an image sensor of a vehicle to the deep neural network;
receive a first prediction generated by the deep neural network based on the image;
disable at least one neuron of plurality of neurons within the deep neural network after the first prediction;
provide the image to the deep neural network;
receive a second prediction generated by the deep neural network;
calculate an average based on at least the first prediction and the second prediction; and
determine the at least one of the measurement or the classification based on the average.

15. The system of claim 9, wherein the object comprises at least a portion of a trailer connected to the vehicle and the measurement comprises a trailer angle.

16. The system of claim 9, wherein the processor is further programmed to:
actuate the vehicle based on the at least one of the measurement or the classification.

17. A method, comprising:
receiving a first prediction generated by a deep neural network based on sensor data;
disabling at least one neuron of a plurality of neurons of the deep neural network after the first prediction;
then providing the sensor data to the deep neural network and receive a second prediction generated by the deep neural network;
calculating a distribution of a plurality of predictions that include the first prediction and the second prediction; and
determining at least one of a measurement or a classification corresponding to an object based on the distribution,
wherein the deep neural network generates each prediction of the plurality of predictions with a different number of neurons determined by randomly disabling some of the plurality of neurons.

* * * * *